A. SCOFIELD.
Grape Trellis.
No. 82,996. Patented Oct. 13, 1868.
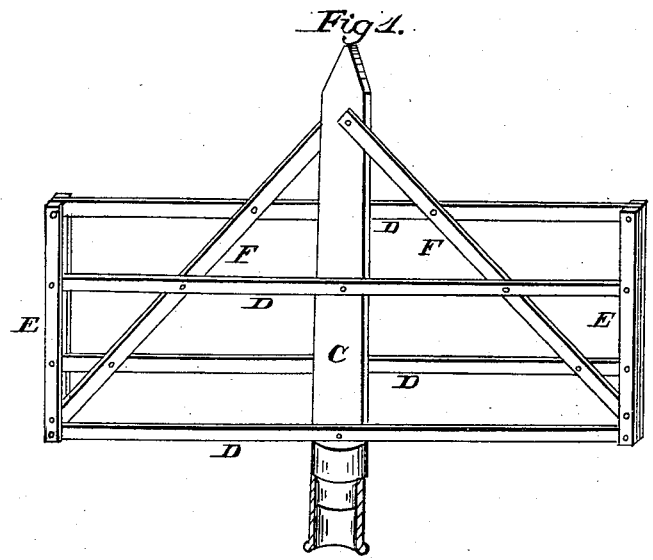
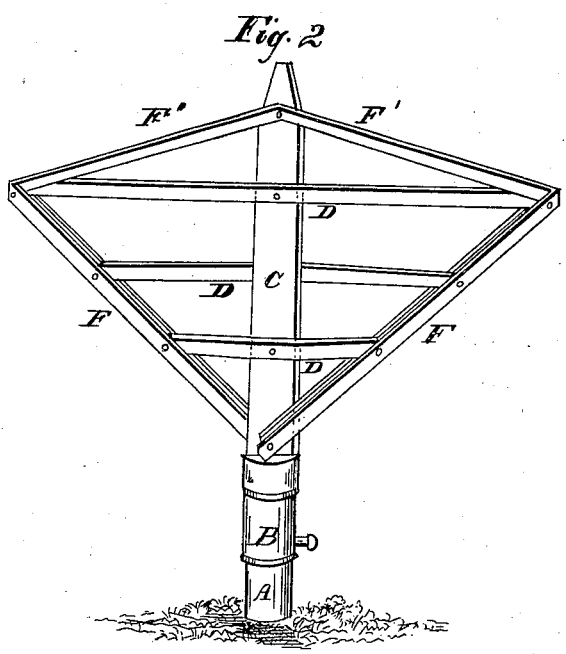
Witnesses:
Joshua K. Ingalls
Elias B. Green
Inventor:
Aleisha Scofield

ABISHA SCOFIELD, OF STARKEY, NEW YORK.

Letters Patent No. 82,996, dated October 13, 1868.

IMPROVEMENT IN GRAPE-TRELLISES.

The Schedule referred to in these Letters Patent and making part of the same.

*To all whom it may concern:*

Be it known that I, ABISHA SCOFIELD, of the town of Starkey, county of Yates, and State of New York, have invented a new and useful Improvement in a Grape-Trellis; and I do hereby declare that the following is a full and exact description thereof, reference being had to the accompanying drawings, in which—

Figure 1 is an elevation.

Figure 2 is also an elevation of a modification.

A is a short stake, of iron or wood, set firmly in the ground;

B is a socket or ferrule;

C is a post;

D is a rail;

E is a stile;

F is a brace; and

G is a pin, for holding the trellis in position.

In fig. 1, B is shown in vertical section.

The nature of my invention consists in forming a grape-trellis in such a manner as to enable me to remove it when desired, and also so turn it, when in place, as to allow the plow or cultivator to pass cross-wise among the vines.

I make the stake, A, of iron or durable wood, with the end above the ground rounded and fitted into the socket B, which turns easily upon it, as an axle.

The socket, B, is made of metal, or of any suitable material, and of sufficient length to admit of the end of the trellis-post C being fitted into and secured to it, and to which it serves as a ferrule or band.

The pin G, I use to hold the trellis in place upon the stake A, and also to prevent its being turned by the wind or by accident.

Upon the post C, I secure the rails D D D D, the ends of which are secured properly to stiles E E, which I make double, as shown. The rails are placed on opposite sides of the post C, and the ends are bent inwards to the same perpendicular line, and held firmly by the stile. This adds stiffness to the trellis. The rails I prefer to make of wood, half inch in thickness, and one and a half inch in width.

In modification, shown in fig. 2, two arms or braces, F F, are made to project from the post C on opposite sides, diagonally, from near the bottom, to the desired length and height. To these I attach the rails D D D, also securing them to the post C, as in the modification first described.

I further strengthen this trellis by the use of the top braces F' F'. This modification I have adopted for steep ground, and as better calculated to admit the rays of the sun and free circulation of the air among the vines.

It is obvious that wires can be substituted for the rails or slats, but the description I have already given, I deem sufficient to enable others skilled in similar constructions to make and use my improved trellis, adopting such modification of form and material as circumstances or individual inclination may favor.

Grape-trellis heretofore used has been made stationary, and with post and rails, continuous and immovable, thus rendering cultivation of the vineyard exceedingly laborious and imperfect. With such trellis the plow or cultivator can only be used lengthwise, leaving a space or "balk" two or three feet in width to be dug up by hand, which cannot be done effectively, since the rails of the trellis prevent.

The ordinary trellis is also exposed to the weather all the year round, and rapidly decays, while the actual need of a trellis in a vineyard is only during the warm and dry months. But my trellis can be changed after the vineyard is plowed one way, so as to plow the ground in the cross-direction, as readily as a field of corn or potatoes. To do this it only requires that the trellis should be turned one-quarter of the way round, and which can easily be done without injury to the vine, the pin G holding it secure in either position, and preventing it from being turned or removed, except as desired.

My trellis can also be removed in the fall, after the vines are pruned, and taken entirely out of the way for fall and spring cultivation. The trellis can thus be secured under cover at least seven-twelfths of the year. My trellis, therefore, saves labor, is ornamental, cheap, and durable.

Having, therefore, described my said invention,

What I claim as new, and desire to secure by Letters Patent, is—

In combination, the post A, socket B, set-screw G, standard C, arms F F', and bars D, arranged as and for the purpose set forth.

ABISHA SCOFIELD.

Witnesses:
LEWIS HALLOCK,
JOSHUA K. INGALLS.